US012509550B2

United States Patent
Wang et al.

(10) Patent No.: US 12,509,550 B2
(45) Date of Patent: Dec. 30, 2025

(54) PREPARATION PROCESS OF ALLYL ALCOHOL POLYETHER WITH LOW POTASSIUM AND SODIUM CONTENT

(71) Applicants: Zhejiang Huangma Technology Co., Ltd., Zhejiang (CN); Zhejiang Lukean Chemical Co., Ltd., Zhejiang (CN); Zhejiang Huangma Shangyi New Material Co., Ltd., Zhejiang (CN); Shangyu Huangma Surface Activated Reagent Research Institute Co., Ltd., Zhejiang (CN)

(72) Inventors: Weisong Wang, Zhejiang (CN); Yifeng Jin, Zhejiang (CN); Xinrong Wang, Zhejiang (CN); Majishi Wang, Zhejiang (CN); Jiongfeng Zhao, Zhejiang (CN)

(73) Assignees: Zhejiang Huangma Technology Co., Ltd., Shaoxing (CN); Zhejiang Lukean Chemical Co., Ltd., Shaoxing (CN); Zhejiang Huangma Shangyi New Material Co., Ltd., Shaoxing (CN); Shangyu Huangma Surface Activated Reagent Research Institute Co., Ltd., Shaoxing (CN)

( * ) Notice: Subject to any disclaimer, the term of this patent is extended or adjusted under 35 U.S.C. 154(b) by 735 days.

(21) Appl. No.: 17/792,717

(22) PCT Filed: Jul. 16, 2021

(86) PCT No.: PCT/CN2021/106806
§ 371 (c)(1),
(2) Date: Jul. 14, 2022

(87) PCT Pub. No.: WO2022/068323
PCT Pub. Date: Apr. 7, 2022

(65) Prior Publication Data
US 2023/0054287 A1    Feb. 23, 2023

(30) Foreign Application Priority Data

Sep. 30, 2020  (CN) .......................... 202011063454.5

(51) Int. Cl.
*C08G 65/26*    (2006.01)
*C08G 65/30*    (2006.01)

(52) U.S. Cl.
CPC ..... *C08G 65/2663* (2013.01); *C08G 65/2609* (2013.01); *C08G 65/30* (2013.01)

(58) Field of Classification Search
CPC .... C08G 65/02; C08G 65/26; C08G 65/2609; C08G 65/2692; C08G 65/30
See application file for complete search history.

(56) References Cited

U.S. PATENT DOCUMENTS 4,985,551 A * 1/1991 Perry ..................... C08G 65/30
536/120

FOREIGN PATENT DOCUMENTS

| CN | 100999575 A | | 7/2007 | |
| CN | 100588669 C | * | 2/2010 | |
| CN | 106750241 A | * | 5/2017 | ......... C08G 65/2609 |
| CN | 107987269 A | * | 5/2018 | ............ C08G 65/30 |
| CN | 108239277 B | | 3/2020 | |

OTHER PUBLICATIONS

Machine translation into English of CN-100588669-C (Year: 2010).*
Machine translation into English of CN-106750241-A (Year: 2017).*
Machine translation into English of CN-107987269-A (Year: 2018).*
International Search Report of PCT Patent Application No. PCT/CN2021/106806 issued on Oct. 13, 2021.

* cited by examiner

*Primary Examiner* — Karuna P Reddy

(57) ABSTRACT

The disclosure provides a preparation process of an allyl alcohol polyether with a low potassium and sodium content, comprising the following steps: reacting allyl alcohol with a mixture of epoxypropane and oxacyclopropane to prepare an allyl alcohol oligomer crude product with a molecular weight of 150-1500; reducing the total content of potassium and sodium ions in the allyl alcohol oligomer crude product prepared in step S1 to 2 ppm or less through a cation exchange resin; and reacting the allyl alcohol oligomer product treated in step S2 with the mixture of epoxypropane and oxacyclopropane to prepare allyl alcohol high-molecular-weight polyether with a molecular weight of 2000-5000. According to the present disclosure, the total content of potassium and sodium ions in the product is reduced to 2 ppm or less, and the product has a good double bond protection rate.

12 Claims, No Drawings

PREPARATION PROCESS OF ALLYL ALCOHOL POLYETHER WITH LOW POTASSIUM AND SODIUM CONTENT

TECHNICAL FIELD

The present disclosure relates to a preparation process of an allyl alcohol polyether, and particularly to a preparation process of an allyl alcohol polyether with a low potassium and sodium content.

BACKGROUND

Allyl alcohol polyether structurally contains a double bond, which mainly has two uses at present: (1) hydrosilylation: it is used for synthesis of organic silicon polyoxyethylene propylene ether; (2) it is used to the field of water reducing agents after double-bond copolymerization. However, there are often different uses for allyl alcohol polyethers with different molecular weights. For example, a polyether with a molecular weight of 200-600 is applicable to agricultural organic silicon auxiliaries and high-resilience foam stabilizers; a polyether with a molecular weight of 600-1000 is applicable to hard foam stabilizers, defoaming agents and water reducing agents; a polyether with a molecular weight of 1000-2000 is applicable to flatting agents, textile auxiliary agents and sticking prevention of leathers; a polyether with a molecular weight of 2000-5000 is applicable to soft foam stabilizers. However, most of potassium and sodium ions in the existing commercially available allyl alcohol polyethers exceed a standard, which seriously limits their applications in various fields. In most cases, impurities potassium and sodium ions in the allyl alcohol polyethers are currently removed using a neutralization-adsorption method, namely, a polyether crude product is firstly hydrolyzed with water, then phosphoric acid and an alkali catalyst are added for neutralization to form phosphates, then an adsorbent, a filter aid and the like are added, and finally a refined polyether product is obtained by dehydration and filtration. For example, Chinese Patent CN108239277B uses this method to refine polyether polyol. However, such the neutralization-adsorption method has many drawbacks: 1, phosphoric acid, sulfuric acid and the like need to be added for neutralization during the neutralization, which causes environmental influence to a certain degree and also needs additional costs to treat waste water; 2, a part of polyether can be remained in a filter cake when in dehydration and filtration, and the content of the residual polyether generally accounts for 50%-60% the weight of the filter cake so as to cause the extreme waste of the product, and meanwhile dangerous solid wastes need to be treated so as to further increase costs; 3, when being filtered, a few amounts of salts, adsorbents and kieselguhr can inevitably enter the product, which causes the activity of the product to be worsened and then influences the application of the downstream product. In addition, the existing commercially available allyl alcohol polyether products, especially polyether products with large molecular weights such as 1000-2000, have relatively low double bond protection rates which are all 91% or less. There is one drawback that the molecular weight of the allyl alcohol polyether product difficultly reaches 2200 or more.

SUMMARY

In order to solve the problem that the existing allyl alcohol polyether product has a high potassium and sodium content, the present disclosure provides a preparation process of an allyl alcohol polyether with a low potassium and sodium content. This process has the advantages of high efficiency, environmental friendliness, stable product quality and the like, can be applicable to polyether products with various molecular weights, and can also gain products with a molecular weight of 3000 or more.

The technical solution of the present disclosure is as follows:

Provided is a preparation process of an allyl alcohol polyether with a low potassium and sodium content, comprising the following steps S1: reacting allyl alcohol with a mixture of epoxypropane and oxacyclopropane to prepare an allyl alcohol oligomer crude product with a molecular weight of 150-1500;

S2: reducing the total content of potassium and sodium ions in the allyl alcohol oligomer crude product prepared in step S1 to 2 ppm or less through a cation exchange resin; and S3: reacting the allyl alcohol oligomer product obtained by being treated in step S2 with the mixture of epoxypropane and oxacyclopropane to prepare allyl alcohol high-molecular-weight polyether with a molecular weight of 2000-5000.

Further, the step S1 specifically comprises: evenly mixing allyl alcohol with an alkaline catalyst, replacing nitrogen for three times and then heating, and continuously adding the mixture of epoxypropane and oxacyclopropane at 80-110° C. under a pressure of ≤0.35 MPa to react until the pressure does not change any more.

Preferably, the alkaline catalyst is at least one of Na, KOH, NaOH, $CHO_3Na$ and $CHO_3K$, and the amount of the alkaline catalyst is 0.2%-0.4% of the weight percentage of the theoretically obtained allyl alcohol oligomer crude product.

Further, in the step S1, a mass ratio of epoxypropane to oxacyclopropane is 1:(0-100).

Further, the step S2 specifically comprises: diluting the prepared allyl alcohol oligomer crude product with a solvent, heating the diluted allyl alcohol oligomer crude product to 20-120° C. according to the viscosity property of the diluted mixed solution, and then passing the heated allyl alcohol oligomer crude product through the cation exchange resin under the protection of nitrogen under the pressure of 0.05-0.2 MPa, wherein the volume of the allyl alcohol oligomer crude product is 2-150 times that of the cation exchange resin, and then removing the solvent to obtain an allyl alcohol oligomer product.

Preferably, the solvent is one of methanol, ethanol, n-propanol, n-hexane, ether, n-propyl ether, n-butyl ether and water, and a mass ratio of the amount of the solvent to the weight of the allyl alcohol polyether crude product is (0-0.9):1.

Preferably, the cation exchange resin is a strongly acidic cation exchange resin, including an Amberlite IR-120 cation exchange resin, a strongly acidic polystyrene sulfonic acid cation exchange resin, a DOO1 macroporous strongly acidic styrene cation exchange resin and a 732 cation exchange resin.

Further, the step S3 specifically comprises: adding a DMC catalyst into the allyl alcohol oligomer product treated in step S2, replacing nitrogen for three times and then heating to 100-110° C. followed by dehydrating for 1-1.5 h, subsequently heating to 120-160° C., and then continuously adding the mixture of epoxypropane and oxacyclopropane under a pressure of ≤0.35 MPa to react until the pressure does not change any more.

Preferably, the addition amount of the DMC catalyst is 0.003-0.007% of the weight percentage of the theoretically obtained allyl alcohol high-molecular-weight polyether.

Further, in the step S3, the mass ratio of epoxypropane to oxacyclopropane is 1:(0-100).

Optionally, the preparation process also comprises a method for regenerating and recycling the cation exchange resin, which comprises:

washing the cation exchange resin with 30-90° C. water until residual allyl alcohol oligomer crude product is free in the resin;

circularly rinsing the cation exchange resin with a 1-20% hydrochloric acid aqueous solution for 1-2 h; and finally washing the cation exchange resin to be neutral with deionized water and applying the washed cation exchange resin to the step S2.

Compared with the prior art, the present disclosure has the beneficial effects:

In the present disclosure, the allyl alcohol oligo-ether crude product is first prepared, and then the allyl alcohol oligo-ether crude product is refined by an ion exchange method, so that the total content of potassium and sodium ions in the product can be reduced to 2 ppm or less, with an extremely good treatment effect; then the refined oligo-ether product is further polymerized to form a polymer product. Compared with the existing preparation methods of allyl polyether, on the one hand, the process of the present disclosure can prepare all kinds of allyl random polyethers from low molecular weights to high molecular weights, and have good double bond protection rates which are all 97% or more; on the other hand, the refining process of polyether does not need the addition of phosphoric acid and sulfuric acid and has no generation of dangerous solid wastes, and thus environmental influence can be effectively reduced, and treatment costs of waste water and solid wastes are saved; in addition, the cation exchange resin used in the preparation process can be regenerated and recycled, which greatly reduces the cost of polyether refining and provides energy conservation and efficiency enhancement for enterprises.

DESCRIPTION OF THE EMBODIMENTS

In the description of the present disclosure, it is noted that if specific conditions are not stated in examples, conventional conditions or conditions recommended by manufacturers are adopted. All reagents or instruments without manufacturers are all conventional products purchased in the market. If specific steps of test methods are not described in examples, conventional test methods are adopted.

Next, the present disclosure will be further described in detail in combination with specific embodiments to help those skilled in the art to more completely, accurately and deeply understand the concept and technical solutions of the present disclosure. The protective scope of the present disclosure includes but not limiting the following examples, amendments made according to the details of the technical solutions and forms of the present disclosure without departing from the spirit and scope of the present application are all included within the protective scope of the present disclosure.

Preparation of Allyl Alcohol Low-Molecular-Weight Polyether

Example 1

This example provides a preparation process of an allyl alcohol polyether with a low potassium and sodium content, comprising the following steps:

S1, 250 g of allyl alcohol and 2.6 g of KOH were added into a reactor, nitrogen was replaced for three times and then a temperature was raised to 80° C., a pressure was controlled at 0.35 MPa or less, then 1045 g of epoxypropane and oxacyclopropane mixture was continuously introduced, wherein a mass ratio of epoxypropane to oxacyclopropane was 1:60, then heat preservation was performed at 90-110° C. after introduction of the above mixture to react until the pressure was reduced to a minimum and did not change any more, and finally an allyl alcohol oligomer crude product was obtained by cooling and degassing.

S2, the oligomer crude product was treated by using a domestic 732 cation exchange resin, wherein a volume ratio of the used exchange resin to the oligomer crude product was 1:50. Firstly, the allyl alcohol oligomer crude product obtained in step S1 was heated to 80° C., then a mixed solution passed through the domestic 732 type resin under the protection of nitrogen at 0.05 MPa, wherein the temperature for passing through the resin was maintained at 80° C., and subsequently a refined allyl alcohol low-molecular-weight polyether product with a low potassium and sodium content was obtained.

Example 2

This example provides a preparation process of an allyl alcohol polyether with a low potassium and sodium content, comprising the following steps:

S1, 100 g of allyl alcohol and 4.1 g of $CHO_3K$ were added into a reactor, nitrogen was replaced for three times and then a temperature was raised to 85° C., a pressure was controlled at 0.35 MPa or less, then 1280 g of epoxypropane and oxacyclopropane mixture was continuously introduced, wherein a mass ratio of epoxypropane to oxacyclopropane was 1:80, heat preservation was performed at 100-110° C. after introduction of the above mixture to react until the pressure was reduced to a minimum and did not change any more, and finally an allyl alcohol oligomer crude product was obtained by cooling and degassing.

S2, the oligomer crude product was treated by using a strongly acidic polystryrolsulfon acid type cation exchange resin, wherein a volume ratio of the used exchange resin to the oligomer crude product was 1:120. Firstly, the allyl alcohol oligomer crude product obtained in step S1 was mixed and diluted with n-hexane and heated to 95° C., wherein a mass ratio of n-hexane to the allyl alcohol oligomer crude product was selected as 0.6:1, then a mixed solution passed through the strongly acidic polystryrolsulfon acid type cation exchange resin under the protection of nitrogen at 0.1 MPa, wherein the temperature for passing through the resin was maintained at 95° C., then the mixed solution was heated to 105° C., after that, n-hexane was removed via reduced pressure distillation so as to obtain a refined allyl alcohol low-molecular-weight polyether with a low potassium and sodium content.

Example 3

This example provides a preparation process of an allyl alcohol polyether with a low potassium and sodium content, comprising the following steps:

S1, 100 g of allyl alcohol and 5.1 g of $CHO_3Na$ were added into a reactor, nitrogen was replaced for three times and then a temperature was raised to 100° C., a pressure was controlled at 0.35 MPa or less, then 1624 g of epoxypropane and oxacyclopropane mixture was continuously introduced, wherein a mass ratio of epoxypropane to oxacyclopropane was 1:30, heat preservation was performed at 100-110° C. after introduction of the above mixture to react until the pressure was reduced to a minimum and did not change any more, and finally an allyl alcohol oligomer crude product was obtained by cooling and degassing.

S2, the oligomer crude product was treated by using a D001 macroporous strongly acidic styrene series cation exchange resin, wherein a volume ratio of the used exchange resin to the oligomer crude product was 1:140. Firstly, the allyl alcohol oligomer crude product obtained in step S1 was mixed and diluted with methanol and heated to 40° C., wherein a mass ratio of methanol to the allyl alcohol oligomer crude product was selected as 0.8:1, then a mixed solution passed through the D001 ($H^+$) resin under the protection of nitrogen at 0.15 MPa, wherein the temperature for passing through the resin was maintained at 40° C., then the mixed solution was heated to 85° C., after that, methanol was removed via reduced pressure distillation so as to obtain a refined allyl alcohol low-molecular-weight polyether with a low potassium and sodium content.

Preparation of an Allyl Alcohol
High-Molecular-Weight Polyether

Example 4

300 g of refined allyl alcohol low-molecular-weight polyether with a low potassium and sodium content prepared in example 1 and 0.1 g of DMC catalyst were added into a reactor, nitrogen was replaced for three times and then a temperature was raised to 100° C. followed by dehydrating for 1 h, then the temperature was raised to 120-135° C., a pressure was controlled at 0.35 MPa or less, then 1700 g of epoxypropane and oxacyclopropane mixture was continuously introduced, wherein a mass ratio of epoxypropane to oxacyclopropane was 1:55, heat preservation was performed at 120-135° C. after introduction of the above mixture to react until the pressure was reduced to a minimum and did not change any more, and finally an allyl alcohol high-molecular-weight polyether with a low potassium and sodium content was obtained by cooling and degassing.

Example 5

300 g of refined allyl alcohol low-molecular-weight polyether with a low potassium and sodium content prepared in example 2 and 0.07 g of DMC catalyst were added into a reactor, nitrogen was replaced for three times and then a temperature was raised to 100° C. followed by dehydrating for 1 h, then the temperature was raised to 140-155° C., a pressure was controlled at 0.35 MPa or less, then 1015 g of epoxypropane and oxacyclopropane mixture was continuously introduced, wherein a mass ratio of epoxypropane to oxacyclopropane was 1:90, heat preservation was performed at 140-155° C. after introduction of the above mixture to react until the pressure was reduced to a minimum and did not change any more, and finally an allyl alcohol high-molecular-weight polyether with a low potassium and sodium content was obtained by cooling and degassing.

Example 6

300 g of refined allyl alcohol low-molecular-weight polyether with a low potassium and sodium content prepared in example 3 and 0.08 g of DMC catalyst were added into a reactor, nitrogen was replaced for three times and then a temperature was raised to 100° C. followed by dehydrating for 1 h, then the temperature was raised to 150-160° C., a pressure was controlled at 0.35 MPa or less, then 1050 g of epoxypropane and oxacyclopropane mixture was continuously introduced, wherein a mass ratio of epoxypropane to oxacyclopropane was 1:25, heat preservation was performed at 150-160° C. after introduction of the above mixture to react until the pressure was reduced to a minimum and did not change any more, and finally an allyl alcohol high-molecular-weight polyether with a low potassium and sodium content was obtained by cooling and degassing.

In addition, the method for regenerating and recycling the cation exchange resin used in examples 1-6 comprises: the cation exchange resin was washed with 30-90° C. water until the residual allyl alcohol oligomer crude product was free in the resin; the cation exchange resin was rinsed with a 1-20% hydrochloric acid aqueous solution for 1-2 h; and finally, the cation resin was washed to be neutral with deionized water and applied to the step S2.

By test, specific data about the molecular weight, the total potassium and sodium content and the double bond protection rate of the allyl alcohol polyether prepared in each example are seen in Table 1.

TABLE 1

Relevant result data of allyl alcohol polyethers prepared in examples 1-6

| Example | Example 1 | Example 2 | Example 3 | Example 4 | Example 5 | Example 6 |
|---|---|---|---|---|---|---|
| Molecular weight | 295.6 | 788.3 | 1034.5 | 2135.3 | 3507.6 | 4677.7 |
| Hydroxyl value (mgKOH/g) | 189.7 | 71.2 | 54.2 | 26.3 | 16.0 | 12.0 |
| Iodine value ($gI_2$/100 g) | 85.9 | 32.2 | 24.6 | 11.9 | 7.2 | 5.4 |
| Total $K^+$/$Na^+$ content (ppm) | 0.68 | 0.84 | 1.19 | 0.32 | 0.43 | 0.65 |
| Double bond protection rate (%) | 99.4 | 99.0 | 98.6 | 98.5 | 98.0 | 97.8 |

It can be seen from the data in the above table that the total contents of potassium and sodium ions in polyethers with various molecular weights are 2 ppm or less, with an extremely good effect. Furthermore, this preparation method does not need to the addition of phosphoric acid and sulfuric acid and has no generation of dangerous solid wastes, and thus environmental influence can be effectively reduced, and treatment costs of waste water and solid wastes are saved. In addition, by using the process of the present disclosure, polyethers with various molecular weights can be prepared, the maximum molecular weight of the obtained polyether can be close to 5000, all the polyethers prepared by using the process have an excellent double bond protection rate which is 97% or more, thereby greatly enhancing the application effect of the obtained polyethers in the downstream products.

Comparative example 1

This comparative example provides a preparation process of an allyl alcohol polyether, comprising the following steps:
S1, 250 g of allyl alcohol and 2.6 g of KOH were added into a reactor, nitrogen was replaced for three times and then a temperature was raised to 80° C., a pressure was controlled at 0.35 MPa or less, then 1045 g of epoxypropane and oxacyclopropane mixture was continuously introduced, wherein a mass ratio of epoxypropane to oxacyclopropane was 1:60, heat preservation was performed at 90-110° C. after introduction of the above mixture to react until the pressure was reduced to a minimum and did not change any more, and finally an allyl alcohol oligomer crude product was obtained by cooling and degassing.
S2, (1) 1000 g of allyl alcohol oligomer crude product prepared in step S1 was put into a 2000 mL four-mouth flask and nitrogen was replaced, 50 g of deionized water was added for hydrolysis after replacement of nitrogen was completed, then 5.1 g of phosphoric acid was added, and then the above materials were evenly mixed and stirred for 1 h; and (2) a mixed solution obtained by neutralizing in step (1) was crystallized, dried and filtered, followed by cooling to 60° C., subsequently 0.5 g of laurinol was added, and then the materials were stirred for 20 min to obtain a low-odor allyl alcohol low-molecular-weight polyether.

Comparative Example 2

This comparative example provides a preparation process of an allyl alcohol high-molecular-weight polyether with a low potassium and sodium content, comprising the following steps:
S1, 300 g of refined allyl alcohol low-molecular-weight polyether prepared in comparative example 1 and 0.1 g of DMC catalyst were added into a reactor, nitrogen was replaced for three times and then a temperature was raised to 100° C. followed by dehydrating for 1 h, then the temperature was raised to 120-135° C., a pressure was controlled at 0.35 MPa or less, then 1700 g of epoxypropane and oxacyclopropane mixture was continuously introduced, wherein a mass ratio of epoxypropane to oxacyclopropane was 1:55, heat preservation was performed at 120-135° C. after introduction of the above mixture to react until the pressure was reduced to a minimum and did not change any more, and finally an allyl alcohol high-molecular-weight polyether was obtained by cooling and degassing.

By test, specific data about the molecular weight, the total potassium and sodium content and the double bond protection rate of the allyl alcohol polyether prepared in each comparative example are seen as follows:

| | Example | | | |
|---|---|---|---|---|
| | Example 1 | Comparative example 1 | Example 4 | Comparative example 2 |
| Molecular weight | 295.6 | 305.2 | 2135.3 | 1431.5 |
| Hydroxyl value (mgKOH/g) | 189.7 | 183.8 | 26.3 | 39.2 |
| Iodine value (gI$_2$/100 g) | 85.9 | 83.2 | 11.9 | 17.7 |
| Total K$^+$/Na$^+$ content (ppm) | 0.68 | 4.11 | 0.32 | 3.22 |
| Double bond protection rate (%) | 99.4 | 94.5 | 98.5 | 90.5 |

By comparing data in example 1 with data in comparative example 1 in the above table, it can be seen that the total content of potassium and sodium ions in the allyl alcohol oligomer obtained by using the preparation method in comparative example 1 is much higher, which is about 4 ppm, and the total content of potassium and sodium ions in the allyl alcohol oligomer obtained in example 1 is 1 ppm or less, with a better effect; in addition, the double bond protection rate of the polyether obtained in example 1 is 5% higher than that in comparative example 1.

When the allyl alcohol high-molecular-weight polyether was prepared, it can be seen by comparing the data in example 4 with the data in comparative example 2 in the above table that the molecular weight of the low-molecular-weight polyether obtained by being treated in comparative example 1 is difficultly increased, while the molecular weight of the polyether obtained by using the same process in comparative example 2 is only increased to about 1400; furthermore, the double bond protection rate is extremely poor and only 90.5%, which affects the application of the polyether in the downstream products.

To sum up, in the present disclosure, the allyl alcohol oligo-ether crude product is firstly prepared and then refined by using the ion exchange method, which can reduce the total content of potassium and sodium ions in the product is reduced to 2 ppm or less with an extremely good treatment effect, and then the refined oligo-ether product is further polymerized to form a polymer product. Compared with the existing preparation method of the allyl alcohol polyether, on the one hand, the process of the present disclosure can prepare all kinds of allyl random polyethers from low molecular weights to high molecular weights, and have good double bond protection rates which are all 97% or more; on the other hand, the refining process of polyether does not need the addition of phosphoric acid and sulfuric acid and has no generation of dangerous solid wastes, and thus environmental influence can be effectively reduced, and treatment costs of waste water and solid wastes are saved; in addition, the cation exchange resin used in the preparation process can be regenerated and recycled, which greatly reduces the cost of polyether refining and provides energy conservation and efficiency enhancement for enterprises.

The above examples are only for expressing several embodiments of the present disclosure, and their descriptions are specific and detailed but cannot be understood as limiting the scope of the present invention patent. It should be noted that several deformations and improvements can also be made by persons of ordinary skill in the art without departing from the concept of the present disclosure, which are all included within the protective scope of the present disclosure. Therefore, the protective scope of the present invention patent should be based on appended claims.

What is claimed is:

1. A preparation process of an allyl alcohol polyether with a low potassium and sodium content, comprising the following steps:
   S1: reacting allyl alcohol with a mixture of epoxypropane and oxacyclopropane to prepare an allyl alcohol oligomer crude product with a molecular weight of 150-1500;
   S2: reducing the total content of potassium and sodium ions in the allyl alcohol oligomer crude product prepared in step S1 to 2 ppm or less through a cation exchange resin; and
   S3: reacting the allyl alcohol oligomer product treated in step S2 with the mixture of epoxypropane and oxacyclopropane to prepare allyl alcohol high-molecular-weight polyether with a molecular weight of 2000-5000, wherein
   the step S2 comprises: heating the prepared allyl alcohol oligomer crude product or a diluted solution obtained by diluting the prepared allyl alcohol oligomer crude product with a solvent to a temperature of 20-120° C., and then passing through the cation exchange resin under a protection of nitrogen under a pressure of 0.05-0.2 MPa, wherein a volume of the allyl alcohol oligomer crude product is 2-150 times that of the cation exchange resin, optionally removing the solvent if present; and
   the step S3 comprises: adding a DMC catalyst into the allyl alcohol oligomer product obtained after step S2, replacing nitrogen for three times and then heating to a temperature of 100-110° C. followed by dehydrating for 1-1.5 h, subsequently heating to 120-160° C., and then continuously adding the mixture of epoxypropane and oxacyclopropane under a pressure of ≤0.35 MPa to react until the pressure does not change any more; and
   in the step S3, a mass ratio of the epoxypropane to the oxacyclopropane is in a range of 1:25-100.

2. The preparation process of an allyl alcohol polyether with a low potassium and sodium content according to claim 1, wherein the step S1 comprises: evenly mixing allyl alcohol with an alkaline catalyst, replacing nitrogen for three times and then heating, and continuously adding the mixture of epoxypropane and oxacyclopropane at 80-110° C. under a pressure of ≤0.35 MPa to react until the pressure does not change any more.

3. The preparation process of an allyl alcohol polyether with a low potassium and sodium content according to claim 2, wherein the alkaline catalyst is at least one of Na, KOH, NaOH, $CHO_3Na$ and $CHO_3K$, and an amount of the alkaline catalyst is 0.2%-0.4% of a weight percentage of a theoretically obtained allyl alcohol oligomer crude product.

4. The preparation process of an allyl alcohol polyether with a low potassium and sodium content according to claim 2, wherein in the step S1, a mass ratio of epoxypropane to oxacyclopropane is 1: (25-100).

5. The preparation process of an allyl alcohol polyether with a low potassium and sodium content according to claim 1, wherein the cation exchange resin is polystyrene sulfonic acid cation exchange resin.

6. The preparation process of an allyl alcohol polyether with a low potassium and sodium content according to claim 1, wherein an addition amount of the DMC catalyst is 0.003-0.007% of a weight percentage of the theoretically obtained allyl alcohol high-molecular-weight polyether.

7. The preparation process of an allyl alcohol polyether with a low potassium and sodium content according to claim 1, wherein the preparation process also comprises a method for regenerating and recycling the cation exchange resin after S2, which comprises:
   washing the cation exchange resin after S2 with 30-90° C. water until residual allyl alcohol oligomer crude product is free in the resin;
   circularly rinsing the cation exchange resin with a 1-20% hydrochloric acid aqueous solution for 1-2 h; and
   finally washing the cation exchange resin to be neutral with deionized water and applying the washed cation exchange resin to the step S2.

8. The preparation process of an allyl alcohol polyether with a low potassium and sodium content according to claim 2, wherein the preparation process also comprises a method for regenerating and recycling the cation exchange resin after S2, which comprises:
   washing the cation exchange resin after S2 with 30-90° C. water until residual allyl alcohol oligomer crude product is free in the resin;
   circularly rinsing the cation exchange resin with a 1-20% hydrochloric acid aqueous solution for 1-2 h; and
   finally washing the cation exchange resin to be neutral with deionized water and applying the washed cation exchange resin to the step S2.

9. The preparation process of an allyl alcohol polyether with a low potassium and sodium content according to claim 3, wherein the preparation process also comprises a method for regenerating and recycling the cation exchange resin after S2, which comprises:
   washing the cation exchange resin after S2 with 30-90° C. water until residual allyl alcohol oligomer crude product is free in the resin;
   circularly rinsing the cation exchange resin with a 1-20% hydrochloric acid aqueous solution for 1-2 h; and
   finally washing the cation exchange resin to be neutral with deionized water and applying the washed cation exchange resin to the step S2.

10. The preparation process of an allyl alcohol polyether with a low potassium and sodium content according to claim 4, wherein the preparation process also comprises a method for regenerating and recycling the cation exchange resin after S2, which comprises:
    washing the cation exchange resin after S2 with 30-90° C. water until residual allyl alcohol oligomer crude product is free in the resin;
    circularly rinsing the cation exchange resin with a 1-20% hydrochloric acid aqueous solution for 1-2 h; and
    finally washing the cation exchange resin to be neutral with deionized water and applying the washed cation exchange resin to the step S2.

11. The preparation process of an allyl alcohol polyether with a low potassium and sodium content according to claim 5, wherein the preparation process also comprises a method for regenerating and recycling the cation exchange resin after S2, which comprises:
    washing the cation exchange resin after S2 with 30-90° C. water until residual allyl alcohol oligomer crude product is free in the resin;
    circularly rinsing the cation exchange resin with a 1-20% hydrochloric acid aqueous solution for 1-2 h; and
    finally washing the cation exchange resin to be neutral with deionized water and applying the washed cation exchange resin to the step S2.

12. The preparation process of an allyl alcohol polyether with a low potassium and sodium content according to claim 6, wherein the preparation process also comprises a method for regenerating and recycling the cation exchange resin after S2, which comprises:
- washing the cation exchange resin after S2 with 30-90° C. water until residual allyl alcohol oligomer crude product is free in the resin;
- circularly rinsing the cation exchange resin with a 1-20% hydrochloric acid aqueous solution for 1-2 h; and
- finally washing the cation exchange resin to be neutral with deionized water and applying the washed cation exchange resin to the step S2.

* * * * *